(12) United States Patent
Tabuchi et al.

(10) Patent No.: US 6,596,255 B2
(45) Date of Patent: Jul. 22, 2003

(54) TIN-CONTAINING GRANULAR MAGNETIC OXIDE PARTICLES AND PROCESS FOR PRODUCING THE SAME

(75) Inventors: Mitsuharu Tabuchi, Suita (JP); Tomonari Takeuchi, Ikeda (JP); Hiroyuki Kageyama, Toyonaka (JP); Tatsuya Nakamura, Himeji (JP); Hiromitsu Misawa, Hatsukaichi (JP)

(73) Assignees: National Institute of Advanced Industrial Science and Technology, Tokyo (JP); Toda Kogyo Corporation, Hiroshima-ken (JP)

(*) Notice: Subject to any disclaimer, the term of this patent is extended or adjusted under 35 U.S.C. 154(b) by 253 days.

(21) Appl. No.: 09/861,857

(22) Filed: May 22, 2001

(65) Prior Publication Data

US 2001/0055557 A1 Dec. 27, 2001

(30) Foreign Application Priority Data

May 25, 2000 (JP) .......................... 2000-154247

(51) Int. Cl.⁷ .................. C01G 49/02; C01G 19/02; B01J 23/745
(52) U.S. Cl. ................. 423/594; 423/618; 423/632; 502/325; 502/326; 502/338; 502/352
(58) Field of Search ................ 502/325, 326, 502/328, 352; 423/594, 618, 632

(56) References Cited

U.S. PATENT DOCUMENTS

| | | | |
|---|---|---|---|
| 3,763,045 A | * 10/1973 | Takamizawa et al. | 252/62.57 |
| 3,893,951 A | * 7/1975 | Grasselli et al. | 252/468 |
| 4,282,302 A | 8/1981 | Makino et al. | |
| 4,292,294 A | * 9/1981 | Patil et al. | 423/594 |
| 4,551,260 A | * 11/1985 | Hayakawa et al. | 252/62.59 |
| 4,676,838 A | * 6/1987 | Franz et al. | 106/304 |
| 4,824,734 A | * 4/1989 | Takajo | 428/570 |
| 5,798,198 A | 8/1998 | Sukovich et al. | |
| 6,017,645 A | * 1/2000 | Taihades et al. | 428/694 ML |

FOREIGN PATENT DOCUMENTS

| | | |
|---|---|---|
| EP | 0708379 A2 | 4/1996 |
| JP | 7-115009 | 5/1995 |
| JP | 10-149910 | 6/1998 |
| JP | 11-249335 | 9/1999 |

OTHER PUBLICATIONS

*Chemical Abstracts*, vol. 92, No. 12, Mar. 24, 1980 (#103367d); Hideo et al; "Formation of ferromagnetic precipitates of iron tin oxide (Fel–xSnx04/3)," p. 624; column 2 (abstract) & Nippon Kagaku Kaishi, No. 1, 1980, pp. 24–27.
Berry et al: "Location of tin and charge balance in materials of composition Fe3–xSnxO4," Polyhedron, vol. 17, No. 1, 1998, pp. 149–152, (whole document).
Djega–Maridassou et al: "preparation et Proprietes Cristallographiques des phases Fe3–x SnxO4," *Annales De Chimie*, vol. 8, No. 1, 1973, pp. 15–20, (whole document).
Berry et al: "Synthesis and characterization of tin–doped iron oxides," *Journal of Materials Chemistry*, vol. 9, No. 1, 1999, pp. 223–226.
Berry et al: "Structure and Properties of Tin–Doped Metal Oxides," *Nato Science Series. General Sub–Series A, Life Sciences*, vol. 66, 1999, pp. 1–12.
Berry et al: "The High Temperature Properties of Tin–Doped Magnetite," *Journal of Solid State Chemistry*, vol. 122, No. 6, 1996, pp. 353–357.

* cited by examiner

*Primary Examiner*—Cam Nguyen
(74) *Attorney, Agent, or Firm*—Nixon & Vanderhye P.C.

(57) ABSTRACT

Tin-containing granular magnetic oxide particles comprising spinel-type crystal represented by the formula:

$$Fe_{3-x}Sn_xO_4$$

wherein x is 0.14 to 0.48, and
having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 $\mu m$ at which three or more continuous lines each having a length of not less than 10 mm are developed in a pigment dispersion test using a grindmeter when measured by Hoover's muller method according to JIS K5101 (1991) 9.1. The tin-containing granular magnetic oxide particles of the present invention exhibit a sufficient blackness, a small magnetization value and an excellent dispersibility.

5 Claims, No Drawings

TIN-CONTAINING GRANULAR MAGNETIC OXIDE PARTICLES AND PROCESS FOR PRODUCING THE SAME

BACKGROUND OF THE INVENTION

The present invention relates to tin-containing granular magnetic oxide particles and a process for producing the same, and more particularly, to tin-containing granular magnetic oxide particles having a high blackness, a small magnetization value and an excellent dispersibility, and a process for producing such particles. The tin-containing granular magnetic oxide particles of the present invention are useful as a color pigment for paints, printing inks, rubbers and plastics, a magnetic toner material, a magnetic carrier material or the like.

Granular magnetic oxide particles showing a good blackness have been extensively used as black color pigment for paints, printing inks, rubbers and plastics. Further, the granular magnetic oxide particles are ferromagnetic particles and, therefore, have also been used as magnetic particles for magnetic toner and magnetic carrier employed in electrostatic copying systems, e.g., in the form of composite particles prepared by mixing and dispersing the granular magnetic oxide particles in resin.

Various properties of a coating film containing a color pigment are varied depending upon dispersibility of the pigment in the coating film. For example, when the pigment has a good dispersibility in vehicle or resin, it is possible to not only obtain a coating film having a clear color tone, but also improve properties of the pigment particles such as tinting property and hiding property. Further, the obtained coating film is enhanced in gloss, clearness, mechanical properties and air-impermeability, resulting in high durability of the coating film. Therefore, the pigment particles are required to exhibit an excellent dispersibility in vehicle or resin.

Also, with the recent tendency toward miniaturization and higher-speed performance of electrostatic copying machines, it has been demanded to provide a magnetic toner and a magnetic carrier capable of exhibiting excellent properties such as a high density development and a high definition. These properties have a close relationship with various properties and dispersibility of magnetic particles contained in resin.

For example, when the amount of the magnetic particles contained in the magnetic toner is increased in order to achieve the high density development, the magnetic particles tend to be magnetically agglomerated together, so that the magnetic toner is attached onto a developed latent image in the form of massive particles, thereby failing to accurately develop fine latent images and reproduce images having a high definition. In addition, when the magnetic particles have a poor dispersibility in resin, the magnetic particles are inhibited from being uniformly dispersed in the resin, so that the resultant magnetic toner particles become magnetically non-uniform, or the content of the magnetic particles in the magnetic toner is lowered. As a result, it is not possible to achieve the high density development and obtain images having a high definition.

Further, in order to obtain images having a high density and a high definition, it has been required not only to minimize a magnetization value of the magnetic particles so as not to generate a magnetic alloy agglomerated together even when the amount of the magnetic particles contained in resin is increased, but also to maximize the $Fe^{2+}$ content of the magnetic particles so as to enhance dispersibility of the magnetic particles in resin and attain a sufficient blackness.

The granular magnetic oxide particles having a small magnetization value are produced by mixing an alkaline aqueous solution such as an aqueous sodium hydroxide solution in an aqueous ferrous salt solution such as an aqueous ferrous sulfate solution to neutralize the aqueous ferrous salt solution; adding an aqueous solution containing a zinc compound such as zinc hydroxide to the mixed solution; and then passing an oxidative gas through the resultant mixture at a temperature of 60 to 100° C. (Japanese Patent Application Laid-Open (KOKAI) No. 4-184354 (1992)). However, the granular magnetic oxide particles obtained by the above method have a small $Fe^{2+}$ content and, therefore, fail to show a sufficient blackness.

In addition, the granular magnetic oxide particles having a small magnetization value are produced by mixing 24.0 to 99.2% by weight of hematite or a mixture of hematite and magnetite, 0.8 to 76.0% by weight of a Sn compound (calculated as Sn) and 0.1 to 4.0% by weight of a liquid or solid substance containing —C—C— or —C=C— in a molecule thereof; and sintering the resultant mixture at a temperature of 1,200 to 1,450° C. in an inert gas atmosphere (Japanese Patent Application Laid-Open (KOKAI) No. 7-115009(1995)). However, since the granular magnetic oxide particles obtained by the above method are sintered at as high a temperature as 1,200 to 1,450° C., it has been found that as a dispersion characteristic a depth of a groove of at which three or more continuous lines each having a length of not less than 10 mm are developed in a pigment dispersion test using a grind-meter when measured by Hoover's muller method according to JIS K5101 (1991) 9.1, is as large as 100 μm. This indicates that the granular magnetic oxide particles obtained by the conventional method is deteriorated in dispersibility.

Further, the magnetic oxide particles having a good dispersibility are produced by adding to an aqueous ferrous salt solution, a silicon salt and a salt of at least one metal element selected from the group consisting of Mn, Zn, Ni, Cu, Co, Cr, Cd, Al, Sn and Mg in an amount of 0.2 to 4.0% by weight based on the weight of iron element contained in the ferrous salt; adding an alkaline aqueous solution such as an aqueous sodium hydroxide solution to the obtained mixed aqueous solution; passing air through the obtained aqueous solution containing ferrous hydroxide while maintaining the pH value thereof to not less than 7 to oxide ferrous hydroxide, thereby obtaining a magnetic iron oxide seed crystal; adding an aqueous ferrous salt solution such as an aqueous ferrous sulfate solution to the aqueous solution; and then passing air through the resultant solution while maintaining the pH value thereof to 6 to 10 to growth the magnetic iron oxide seed crystal (Japanese Patent Application Laid-Open (KOKAI) No. 11-249335(1999)). However, in this KOKAI, it is suggested that the content of the salt of at least one metal element selected from the group consisting of Mn, Zn, Ni, Cu, Co, Cr, Cd, Al, Sn and Mg is increased, the obtained magnetic oxide particles tend to be deteriorated in dispersibility.

As a result of the present inventors' earnest studies to solve the above problem, it has been found that by mixing an aqueous ferrous salt solution, an aqueous solution containing a tin compound in an amount of 10 to 30 mol % (calculated as Sn) based on ferrous iron and an aqueous alkali solution, thereby obtaining a suspension containing Fe- and Sn-containing precipitates; and then subjecting the resultant suspension containing Fe- and Sn-containing precipitates to hydrothermal treatment, the obtained tin-containing granular magnetic oxide particles can exhibit a high blackness, a small magnetization value and an excellent dispersibility. The present invention has been attained based on the above finding.

SUMMARY OF THE INVENTION

An object of the present invention is to provide granular magnetic oxide particles exhibiting a sufficient blackness, a small magnetization value and an excellent dispersibility, and a process for producing such granular magnetic oxide particles.

To accomplish the aim, in a first aspect of the present invention, there are provided tin-containing granular magnetic oxide particles comprising spinel-type crystal represented by the formula:

$$Fe_{3-x}Sn_xO_4$$

wherein x is 0.14 to 0.48, and having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a second aspect of the present invention, there are provided tin-containing granular magnetic oxide particles comprising spinel-type crystal represented by the formula:

$$Fe_{3-x}Sn_xO_4$$

wherein x is 0.14 to 0.48, and having an average particle diameter of 0.1 to 0.3 μm, a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, a blackness (a* value) of not more than +1.5, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a third aspect of the present invention, there is provided a process for producing tin-containing granular magnetic oxide particles, comprising:

mixing an aqueous ferrous salt solution, an aqueous solution containing a tin compound in an amount of 10 to 30 mol %, calculated as Sn, based on ferrous iron contained in the ferrous salt and an aqueous alkali solution to obtain Fe- and Sn-containing precipitates; and subjecting the Fe- and Sn-containing precipitates to hydrothermal treatment.

In a fourth aspect of the present invention, there is provided a color pigment comprising tin-containing granular magnetic oxide particles comprising spinel-type crystal represented by the formula:

$$Fe_{3-x}Sn_xO_4$$

wherein x is 0.14 to 0.48, and having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a fifth aspect of the present invention, there is provided a color pigment comprising tin-containing granular magnetic oxide particles comprising spinel-type crystal represented by the formula:

$$Fe_{3-x}Sn_xO_4$$

wherein x is 0.14 to 0.48, and having an average particle diameter of 0.1 to 0.3 μm, a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, a blackness (a* value) of not more than +1.5, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a sixth aspect of the present invention, there is provided a magnetic toner comprising a binder resin and tin-containing granular magnetic oxide particles comprising spinel-type crystal represented by the formula:

$$Fe_{3-x}Sn_xO_4$$

wherein x is 0.14 to 0.48, and having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a seventh aspect of the present invention, there is provided a magnetic toner comprising a binder resin and tin-containing granular magnetic oxide particles comprising spinel-type crystal represented by the formula:

$$Fe_{3-x}Sn_xO_4$$

wherein x is 0.14 to 0.48, and having an average particle diameter of 0.1 to 0.3 μm, a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, a blackness (a* value) of not more than +1.5, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In an eighth aspect of the present invention, there is provided a magnetic carrier comprising a binder resin and tin-containing granular magnetic oxide particles comprising spinel-type crystal represented by the formula:

$$Fe_{3-x}Sn_xO_4$$

wherein x is 0.14 to 0.48, and having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

In a ninth aspect of the present invention, there is provided a magnetic carrier comprising a binder resin and tin-containing granular magnetic oxide particles comprising spinel-type crystal represented by the formula:

$$Fe_{3-x}Sn_xO_4$$

wherein x is 0.14 to 0.48, and having an average particle diameter of 0.1 to 0.3 μm, a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, a blackness (a* value) of not more than +1.5, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

DETAILED DESCRIPTION OF THE INVENTION

The present invention will now be described in detail below. The tin-containing granular magnetic oxide particles of the present invention comprise spinel-type crystal represented by the above chemical formula. The existence or non-existence of Sn element in the spinel-type crystal lattice (crystal lattice with spinel structure) may be confirmed by measuring the change in lattice constant obtained from X-ray diffraction pattern, relative to the Sn content. When the Sn element is not present within the spinel-type crystal lattice, it is not possible to obtain granular magnetic particles having a small magnetization value.

According to the above chemical formula, the content of the Sn element in the tin-containing granular magnetic oxide particles is usually 7 to 22% by weight (corresponding to such a formula in which x is 0.14 to 0.48), preferably 10 to 20% by weight. When the content of the Sn element is less than 7% by weight, it is not possible to obtain the aimed granular magnetic oxide particles having a small magnetization value. When the content of the Sn element is more than 22% by weight, Sn compounds are precipitated during the production of the granular magnetic oxide particles, resulting in deteriorated dispersibility and blackness of the obtained particles.

The tin-containing granular magnetic oxide particles of the present invention have a $Fe^{2+}$ content of usually 17 to 22% by weight, preferably 18 to 22% by weight. When the $Fe^{2+}$ content is less than 17% by weight, the obtained granular magnetic oxide particles is insufficient in blackness. When the $Fe^{2+}$ content is more than 22% by weight, the obtained granular magnetic oxide particles show a sufficient blackness, but are deteriorated in oxidation stability, resulting in poor workability in air.

The tin-containing granular magnetic oxide particles of the present invention have a lattice constant of usually 8.41 to 8.49 Å, preferably 8.43 to 8.48 Å. There is such a tendency that the larger the content of the Sn element in the spinel-type crystal lattice, the larger the lattice constant. For example, when the content of the Sn element is 7.8% by weight, the lattice constant is about 8.41 Å, and when the content of the Sn element is 21.7% by weight, the lattice constant is about 8.49 Å. When the lattice constant is less than 8.41 Å, the obtained granular magnetic oxide particles are insufficient in blackness. When the lattice constant is more than 8.49 Å, the obtained granular magnetic oxide particles are deteriorated in oxidation stability.

The tin-containing granular magnetic oxide particles of the present invention have a magnetization value of usually 20 to 50 $Am^2/kg$, preferably 25 to 45 $Am^2/kg$ when measured under an applied magnetic field of 79.6 kA/m. There is such a tendency that the larger the content of the Sn element in the spinel-type crystal lattice, the smaller the magnetization value. When the content of the Sn element is 21.7% by weight, the magnetization value is about 20 $Am^2/kg$. When the magnetization value is less than 20 $Am^2/kg$, the obtained magnetic toner tends to be scattered, thereby failing to obtain images having a high definition. When the magnetization value is more than 50 $Am^2/kg$, the obtained granular magnetic oxide particles tend to show a large magnetic cohesion force, resulting in deteriorated dispersibility in vehicle or resin and thereby failing to obtain images having a high density and a high definition.

The tin-containing granular magnetic oxide particles of the present invention have as a dispersion characteristic a depth of a groove of usually not more than 40 μm, preferably not more than 30 μm, more preferably not more than 20 μm, wherein the dispersion characteristic value is expressed by the depth of a groove at which three or more continuous lines each having a length of not less than 10 mm are developed in a pigment dispersion test using a grind-meter when measured by Hoover's muller method according to JIS K5101 (1991) 9.1. When as a dispersion characteristic the depth of a groove at which three or more continuous lines each having a length of not less than 10 mm are developed, is more than 40 μm, the obtained granular magnetic oxide particles tend to be deteriorated in dispersibility in vehicle or resin, thereby failing to obtain images having a high density and a high definition.

The blackness of the tin-containing granular magnetic oxide particles of the present invention is expressed by the a* value which is measured by applying on a mirror coating paper the paste obtained by a method according to JIS K5101 (1991) 6.1 using a 6 mil film applicator; and subjecting the resultant film to colorimetry by a method according to JIS Z 8729 using a spectrographic calorimeter. In the present invention, the a* value is usually not more than +1.5, preferably not more than +1.0, more preferably not more than +0.5. When the a* value is more than +1.5, the obtained particles tend to show a strong red color, thereby failing to obtain particles having a sufficient blackness.

The tin-containing granular magnetic oxide particles of the present invention have an average particle diameter of usually 0.1 to 0.3 μm, preferably 0.15 to 0.25 μm. When the average particle diameter is less than 0.1 μm, the obtained granular magnetic oxide particles tend to be deteriorated in dispersibility since the magnetic cohesive force therebetween becomes increased. When the average particle diameter is more than 0.3 μm, the obtained granular magnetic oxide particles tend to be deteriorated in tinting property. In the case of the average particle diameter is more than 0.3 μm, the magnetic toner produced therefrom tends to contain only a less number of the granular magnetic oxide particles per one magnetic toner particle, or the distribution of the granular magnetic oxide particles in one magnetic toner particle tends to become non-uniform, resulting in non-uniform charging property of the obtained magnetic toner.

Next, the process for producing the tin-containing granular magnetic oxide particles according to the present invention will be described below. In the process of the present invention, an aqueous ferrous salt solution, an aqueous solution containing a tin compound in an amount of 10 to 30 mol %, calculated as Sn, based on ferrous iron contained in the ferrous salt and an aqueous alkali solution are firstly mixed to obtain Fe- and Sn-containing precipitates. It is preferred that an aqueous ferrous salt solution is mixed with an aqueous solution containing a tin compound in an amount of 10 to 30 mol %, calculated as Sn, based on ferrous iron contained in the ferrous salt, and an aqueous alkali solution is added to the mixed solution to obtain Fe- and Sn-containing precipitates.

Concretely, an aqueous ferrous salt solution is first mixed with an aqueous solution containing a tin compound in an amount of usually 10 to 30 mol % (calculated as Sn) based on ferrous iron, thereby obtaining a mixed solution containing iron and tin. More specifically, a ferrous salt is dissolved in water to obtain an aqueous ferrous salt solution containing the ferrous salt in an amount of usually about 0.1 to 10 M, preferably about 0.5 to 5 M (calculated as Fe). Separately, a tin compound is dissolved in water or alcohol solution to obtain an aqueous solution containing the tin compound in an amount of usually about 0.001 to 5 M, preferably about 0.5 to 2 M (calculated as Fe). The thus obtained aqueous ferrous salt solution and aqueous tin compound-containing solution are mixed together to obtain a mixed solution containing iron and tin.

Then, an aqueous alkali solution is added to the obtained iron- and tin-containing solution to form Fe—Sn co-precipitates. The amount added of the aqueous alkali solution is not less than 1 equivalent per ferrous and tin in the aqueous mixed solution. The upper limit thereof is preferably 2.0 equivalent per ferrous and tin in the aqueous mixed solution, more preferably 1.6 equivalent per ferrous and tin in the aqueous mixed solution. The aqueous alkali solution is gradually dropped into the iron- and tin-containing solution while stirring. After completion of dropping, the resultant solution is stirred at room temperature for about several hours to about one day, thereby obtaining a suspension containing the aimed Fe—Sn co-precipitates.

The obtained suspension containing Fe—Sn co-precipitates are then subjected to hydrothermal treatment to obtained the aimed product. Specifically, the suspension containing Fe—Sn co-precipitates are hydrothermally treated within a hydrothermal reaction furnace, e.g., autoclave. The conditions of the hydrothermal reaction are not particularly restricted. The hydrothermal reaction temperature is usually about 101 to 300° C., preferably about 200 to 250° C., and the hydrothermal reaction time is usually about 0.5 to 48 hours, preferably about 1 to 10 hours. It is preferred to conduct the hydrothermal treatment in the presence of an ammonium salt and/or alkali salts. It is more preferred to conduct the hydrothermal treatment in the presence of an ammonium salt and/or a salt of the same alkali metal as the aqueous alkali solution used in the mixing step.

After completion of the hydrothermal reaction, the reaction product is washed with water to remove remaining unreacted raw materials therefrom, filtered out and then dried, thereby obtaining the aimed tin-containing granular magnetic oxide particles represented by the following formula:

$$Fe_{3-x}Sn_xO_4$$

wherein x is 0.14 to 0.48.

Examples of the aqueous ferrous salt solution used in the process of the present invention may include aqueous ferrous chloride solution, aqueous ferrous nitrate solution and aqueous ferrous sulfate solution. Among them, preferred is aqueous ferrous sulfate solution. These aqueous ferrous salt solution may be used singly or in the form of a mixture of any two or more thereof. Examples of the aqueous solution containing a tin compound used in the process of the present invention may include aqueous stannous chloride solution, aqueous stannous nitrate solution and aqueous stannous sulfate solution. Among them, preferred is aqueous stannous chloride solution. These aqueous solution containing a tin compound may be used singly or in the form of a mixture of any two or more thereof.

Examples of the aqueous alkali solution may include aqueous lithium hydroxide solution, aqueous sodium hydroxide solution, aqueous potassium hydroxide solution, aqueous ammonium hydroxide solution or the like. These aqueous alkali solutions may be used singly or in the form of a mixture of any two or more thereof. Especially, among them, preferred is aqueous sodium hydroxide solution.

Examples of the alkali salts used if required, may include lithium (Li) salts, sodium (Na) salts, potassium (K) salts and ammonium salts. The alkali salts may exist in the suspension containing Fe—Sn co-precipitates prior to the hydrothermal treatment. It is preferred to use a salt of the same alkali metal as the aqueous alkali solution used in the mixing step, so that tin-containing granular magnetic oxide particles having more excellent particle size distribution are obtained. In addition, in case of using an aqueous ammonium solution as an aqueous alkali solution used in the mixing step, it is preferred to use an ammonium salt, thereby obtaining tin-containing granular magnetic oxide particles having more excellent particle size distribution.

Under the consideration of the particle size distribution, the amount added to the suspension containing Fe—Sn co-precipitates prior to the hydrothermal treatment, 0.5 to 1.5 mole based on 1 mole of the aqueous alkali solution.

The thus obtained tin-containing granular magnetic oxide particles have a large $Fe^{2+}$ content and a sufficient blackness. Further, the tin-containing granular magnetic oxide particles are free from magnetic agglomeration since the magnetization value thereof is small, resulting in excellent dispersibility in vehicle or resin.

A color pigment of the present invention comprises the tin-containing granular magnetic oxide particles.

A magnetic toner of the present invention comprises the tin-containing granular magnetic oxide particles and a binder resin.

The magnetic toner according to the present invention has an average particle size of usually 3 to 15 $\mu$m.

As the binder resins for the magnetic toner, there may be used there may be used any known resins. Examples of the resins may include vinyl-based polymers, i.e., homopolymers or copolymers of vinyl-based monomers such as styrene, alkyl acrylates and alkyl methacrylates. As the styrene monomers, there may be exemplified styrene and substituted styrenes. As the alkyl acrylate monomers, there may be exemplified acrylic acid, methyl acrylate, ethyl acrylate, butyl acrylate or the like. It is preferred that the above copolymers contain styrene-based components in an amount of usually 50 to 95% by weight.

The amount of the binder resin used in the magnetic toner is usually 50 to 900 parts by weight, preferably 100 to 400 parts by weight based on 100 parts by weight of the tin-containing granular magnetic oxide particles.

A magnetic carrier of the present invention comprises the tin-containing granular magnetic oxide particles and a binder resin.

The magnetic carrier according to the present invention has an average particle size of usually 10 to 300 μm.

As the binder resins for the magnetic carrier, there may be used there may be used any known resins. Examples of the resins may include epoxy-based resins, silicone-based resins, polyester resins, fluorocarbon-based resins, styrene-based resins, phenol-based resins, silicon-based resins, melamine-based resins, polyamide resins or the like.

The magnetic carrier as composite particles is produced by granulating a mixture composed of a resin, tin-containing granular magnetic oxide particles by a kneading and pulverizing method or a polymerization method. In order to obtain a magnetic carrier having a further enhanced durability, the use of composite particles having a specific gravity as low as especially 2 to 4, is preferred.

As to weight percentages of the resin and the tin-containing granular magnetic oxide particles constituting the composite particles, it is preferred that the amount of the resin is usually 1 to 20% by weight, and the amount of the tin-containing granular magnetic oxide particles is usually 80 to 99% by weight. If required, not more than 70% by weight of the tin-containing granular magnetic oxide particles may be replaced with fine non-magnetic particles such as hematite particles.

Thus, the tin-containing granular magnetic oxide particles of the present invention can show a large $Fe^2+$ content, a sufficient blackness, a small magnetization value, i.e., a less magnetic cohesive force and, therefore, an excellent dispersibility in vehicle or resin. As a result, the tin-containing granular magnetic oxide particles of the present invention are useful as a color pigment for paints, printing inks, rubbers and plastics, a magnetic toner material, a magnetic carrier material or the like. Also, since the tin-containing granular magnetic oxide particles of the present invention are produced at a relatively low temperature, it is possible to provide an industrially advantageous process thereof.

EXAMPLES

The present invention will be described in more detail by reference to the following examples. However, these examples are only illustrative and not intended to limit the present invention thereto.

(1) The content of FeO contained in whole granular magnetic oxide particles is expressed by the value obtained by the following chemical analysis. That is, about 0.5 g of the granular magnetic oxide particles are added and dissolved in 25 ml of a mixed solution containing phosphoric acid and sulfuric acid at a weight ratio of 2:1, in an inert gas atmosphere. After diluting the obtained solution, several droplets of diphenylaminesulfonic acid as an indicator were added to the diluted solution. Then, the resultant diluted solution was subjected to oxidation-reduction titration using an aqueous potassium bichromate solution. The titration was terminated at the time at which the diluted solution was colored violet. The FeO content was calculated from the amount of the aqueous potassium bichromate solution used until reaching the termination of the titration.

(2) The Sn content of the tin-containing granular magnetic oxide particles was measured using an energy-dispersive X-ray analyzer "EDX" manufactured by Hitachi Limited.

(3) The crystal phase of the tin-containing granular magnetic oxide particles was measured by X-ray diffraction analysis. The chemical composition of the tin-containing granular magnetic oxide particles was evaluated by X-ray energy-dispersive spectrum analysis.

(4) The magnetic properties of the tin-containing granular magnetic oxide particles were expressed by the values measured under an applied magnetic field of 79.6 kA/m using a vibration sample-type magnetometer "VSM-3S-15" manufactured by Toei Kogyo Co., Ltd.

(5) The dispersibility of the tin-containing granular magnetic oxide particles was evaluated as follows. That is, 1 mg of sample particles and 10 mg of rosin-modified phenol resin-based varnish for printing inks as vehicle were placed on a lower kneading plate of a Hoover's muller, mixed together by spatula, and spread into a band-like film over the kneading plate. The obtained film was measured by Hoover's muller method according to JIS K5101(1991) 9.1 to determine as a dispersion characteristic a depth of a groove of not more than 40 μm at which three or more continuous lines each having a length of not less than 10 mm are developed in a pigment dispersion test using a grindmeter.

(6) The blackness of the tin-containing granular magnetic oxide particles was determined as follows. That is, 0.5 g of sample particles and 1.5 ml of castor oil were kneaded into paste by Hoover's muller. The obtained paste was mixed and kneaded with 4.5 g of clear lacquer to form a paint. The paint was applied onto a cast coated paper using a 6 mil applicator to prepare a coating film specimen (coating thickness: about 30 μm). The obtained coating film specimen was measured by a method according to JIS Z 8729 using a multi-light source spectrographic calorimeter "MSC-IS-2D" manufactured by Suga Testing Machines Manufacturing Co., Ltd. to express a coloring index a* value. The a* value represents a degree of redness, and the smaller the a* value, the more excellent the blackness.

(7) The shape of the tin-containing granular magnetic oxide particles was evaluated by observing the particles using a transmission electron microscope (magnification: ×20,000) and a scanning electron microscope (magnification: ×40,000). The average particle diameter of the granular magnetic oxide particles was determined by measuring martin diameters of 300 particles on an enlarged photograph obtained by magnifying an original transmission electron micrograph (magnification: ×10,000) by four times.

(8) The particle size distribution of the tin-containing granular magnetic oxide particles was evaluated by the following formula:

$$\text{Variation factor} = \sigma/D \times 100$$

wherein D represents an average particle diameter of the tin-containing granular magnetic oxide particles as defined in the item 7, and σ represents a standard deviation of the tin-containing granular magnetic oxide particles.

The smaller the variation factor value, the more excellent the particle size distribution. When the variation factor value is not more than 30%, the particle size distribution of the tin-containing granular magnetic oxide particles is good. The preferable variation factor value is not more than 25%. If the variation factor value exceeds 30%, the particle size distribution is poor, resulting in the deterioration of the dispersibility as a pigment and various properties of the pigment.

Example 1

4.06 g of stannous chloride dihydrate were added and dissolved in 150 ml of water under stirring. Separately, 45.0 g of ferrous sulfate heptahydrate was added and dissolved in 150 ml of water under stirring. Both the solutions were mixed together while stirring, thereby obtaining a mixed solution containing Sn and Fe at a molar ratio of 1:9. In addition, separately, 22.0 g of sodium hydroxide were added and dissolved in 300 ml of water. The thus obtained alkaline aqueous solution was gradually dropped into the above Fe- and Sn-containing mixed solution while stirring. After completion of dropping, the mixture was further stirred for several hours, thereby obtaining a precipitates containing Sn and Fe at a molar ratio of 1:9. The thus obtained precipitates containing Fe and Sn were hydrothermally treated at 220° C. for one hour using a hydrothermal reaction furnace (autoclave). After completion of the hydrothermal treatment, the obtained reaction product was washed with water to remove an excess amount of sodium hydroxide, filtered out and then dried, thereby obtaining granular particles.

The thus obtained granular particles were fine octahedral particles having a composition of $Fe_{2.84}Sn_{0.16}O_4$. Further, the obtained granular particles had an average particle diameter of 0.23 μm, a lattice constant of 8.412 Å, a $Fe^{2+}$ content of 21.4% by weight, a Sn content of 7.8% by weight, a magnetization value of 48.5 $Am^2/kg$ when measured under an applied magnetic field of 79.6 kA/m, and a blackness (a* value) of +0.3. With respect to the dispersibility, as a result of the evaluation by Hoover's muller method, it was confirmed that no continuous lines having a length of not less than 10 mm were observed in the depth of a groove of not less than 20 μm. The variation factor value was 28%.

Example 2

4.06 g of stannous chloride dihydrate were added and dissolved in 150 ml of water under stirring. Separately, 45.0 g of ferrous sulfate heptahydrate was added and dissolved in 150 ml of water under stirring. Both the solutions were mixed together while stirring, thereby obtaining a mixed solution containing Sn and Fe at a molar ratio of 1:9. In addition, separately, 38.0 g of sodium chloride and 22.0 g of sodium hydroxide were added and dissolved in 300 ml of water. The thus obtained alkaline aqueous solution was gradually dropped into the above Fe- and Sn-containing mixed solution while stirring. After completion of dropping, the mixture was further stirred for several hours, thereby obtaining a precipitates containing Sn and Fe at a molar ratio of 1:9. The thus obtained precipitates containing Sn and Fe were hydrothermally treated at 220° C. for one hour using a hydrothermal reaction furnace (autoclave). After completion of the hydrothermal treatment, the obtained reaction product was washed with water to remove an excess amount of sodium hydroxide, filtered out and then dried, thereby obtaining granular particles.

The thus obtained granular particles were fine octahedral particles having a composition of $Fe_{2.84}Sn_{0.16}O_4$. Further, the obtained granular particles had an average particle diameter of 0.23 μm, a lattice constant of 8.412 Å, a $Fe^{2+}$ content of 21.4% by weight, a Sn content of 7.8% by weight, a magnetization value of 48.5 $Am^2/kg$ when measured under an applied magnetic field of 79.6 kA/m, and a blackness (a* value) of +0.3. With respect to the dispersibility, as a result of the evaluation by Hoover's muller method, it was confirmed that no continuous lines having a length of not less than 10 mm were observed in the depth of a groove of not less than 20 μm. The variation factor value was 22%.

Example 3

6.38 g of stannous chloride anhydride were added and dissolved in 150 ml of methanol under stirring. Separately, 40.0 g of ferrous sulfate heptahydrate was added and dissolved in 150 ml of water under stirring. Both the solutions were mixed together while stirring, thereby obtaining a mixed solution containing Sn and Fe at a molar ratio of 2:8. In addition, separately, 38.0 g of sodium chloride and 22.0 g of sodium hydroxide were added and dissolved in 300 ml of water. The thus obtained alkaline aqueous solution was gradually dropped into the above Fe- and Sn-containing mixed solution while stirring. After completion of dropping, the mixture was further stirred for several hours, thereby obtaining Fe—Sn co-precipitates at a molar ratio of 2:8. The thus obtained Fe—Sn co-precipitates were hydrothermally treated at 220° C. for one hour using a hydrothermal reaction furnace (autoclave). After completion of the hydrothermal treatment, the obtained reaction product was washed with water to remove an excess amount of sodium hydroxide and other alkali salts, filtered out and then dried, thereby obtaining granular particles.

The thus obtained granular particles were fine octahedral particles having a composition of $Fe_{2.65}Sn_{0.35}O_4$. Further, the obtained granular particles had an average particle diameter of 0.18 μm, a lattice constant of 8.470 Å, a $Fe^{2+}$ content of 20.5% by weight, a Sn content of 16.4% by weight, a magnetization value of 35.1 $Am^2/kg$ when measured under an applied magnetic field of 79.6 kA/m, and a blackness (a* value) of +0.5. With respect to the dispersibility, as a result of the evaluation by Hoover's muller method, it was confirmed that no continuous lines having a length of not less than 10 mm were observed in the depth of a groove of not less than 30 μm. The variation factor value was 21%.

Example 4

10.23 g of stannous chloride anhydride were added and dissolved in 150 ml of methanol under stirring. Separately, 35.0 g of ferrous sulfate heptahydrate was added and dissolved in 150 ml of water under stirring. Both the solutions were mixed together while stirring, thereby obtaining a mixed solution containing Sn and Fe at a molar ratio of 3:7. In addition, separately, 38.0 g of sodium chloride and 22.0 g of sodium hydroxide were added and dissolved in 300 ml of water. The thus obtained alkaline aqueous solution was gradually dropped into the above Fe- and Sn-containing mixed solution while stirring. After completion of dropping, the mixture was further stirred for several hours, thereby obtaining Fe—Sn co-precipitates containing Sn and Fe at a molar ratio of 3:7. The thus obtained Fe—Sn co-precipitates were hydrothermally treated at 220° C. for one hour using a hydrothermal reaction furnace (autoclave). After completion of the hydrothermal treatment, the obtained reaction product was washed with water to remove an excess amount of sodium hydroxide and other alkali salts, filtered out and then dried, thereby obtaining granular particles.

The thus obtained granular particles were fine octahedral particles having a composition of $Fe_{2.52}Sn_{0.48}O_4$. Further, the obtained granular particles had an average particle diameter of 0.13 μm, a lattice constant of 8.487 Å, a $Fe^{2+}$ content of 18.1% by weight, a Sn content of 21.8% by weight, a magnetization value of 21.5 $Am^2/kg$ when measured under an applied magnetic field of 79.6 kA/m, and a blackness (a* value) of +0.7. With respect to the dispersibility, as a result of the evaluation by Hoover's muller method, it was confirmed that no continuous lines having a length of not less than 10 mm were observed in the depth of a groove of not less than 30 μm. The variation factor value was 23%.

What is claimed is:

1. Tin-containing granular magnetic oxide particles comprising spinel-type crystal represented by the formula:

$$Fe_{3-x}Sn_xO_4$$

wherein x is 0.14 to 0.48, and having a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

2. Tin-containing granular magnetic oxide particles according to claim 1, which have an average particle diameter of 0.1 to 0.3 μm.

3. Tin-containing granular magnetic oxide particles according to claim 1, which have a Sn content of 10 to 20% by weight, a $Fe^{2+}$ content of 18 to 22% by weight, a lattice constant of 8.43 to 8.48 Å and a magnetization value of 25 to 45 $Am^2/kg$ when measured under an applied magnetic field of 79.6 kA/m.

4. Tin-containing granular magnetic oxide particles according to claim 1, which have blackness (a* value) of not more than +1.5.

5. Tin-containing granular magnetic oxide particles comprising spinel-type crystal represented by the formula:

$$Fe_{3-x}Sn_xO_4$$

wherein x is 0.14 to 0.48, and having an average particle diameter of 0.1 to 0.3 μm, a $Fe^{2+}$ content of 17 to 22% by weight, a lattice constant of 8.41 to 8.49 Å, a magnetization value of 20 to 50 $Am^2/kg$ when measured under an applied magnetic field of 79.6 kA/m, a blackness (a* value) of not more than +1.5, and a depth of a groove of not more than 40 μm at which three or more continuous lines each having a length of not less than 10 mm are developed in a pigment dispersion test using a grind-meter when measured by Hoover's muller method according to JIS K5101 (1991) 9.1.

* * * * *